Feb. 5, 1935.　　　　B. I. BUCK　　　　1,990,425
BEAN NIPPING MACHINE
Filed Dec. 30, 1932　　9 Sheets-Sheet 1
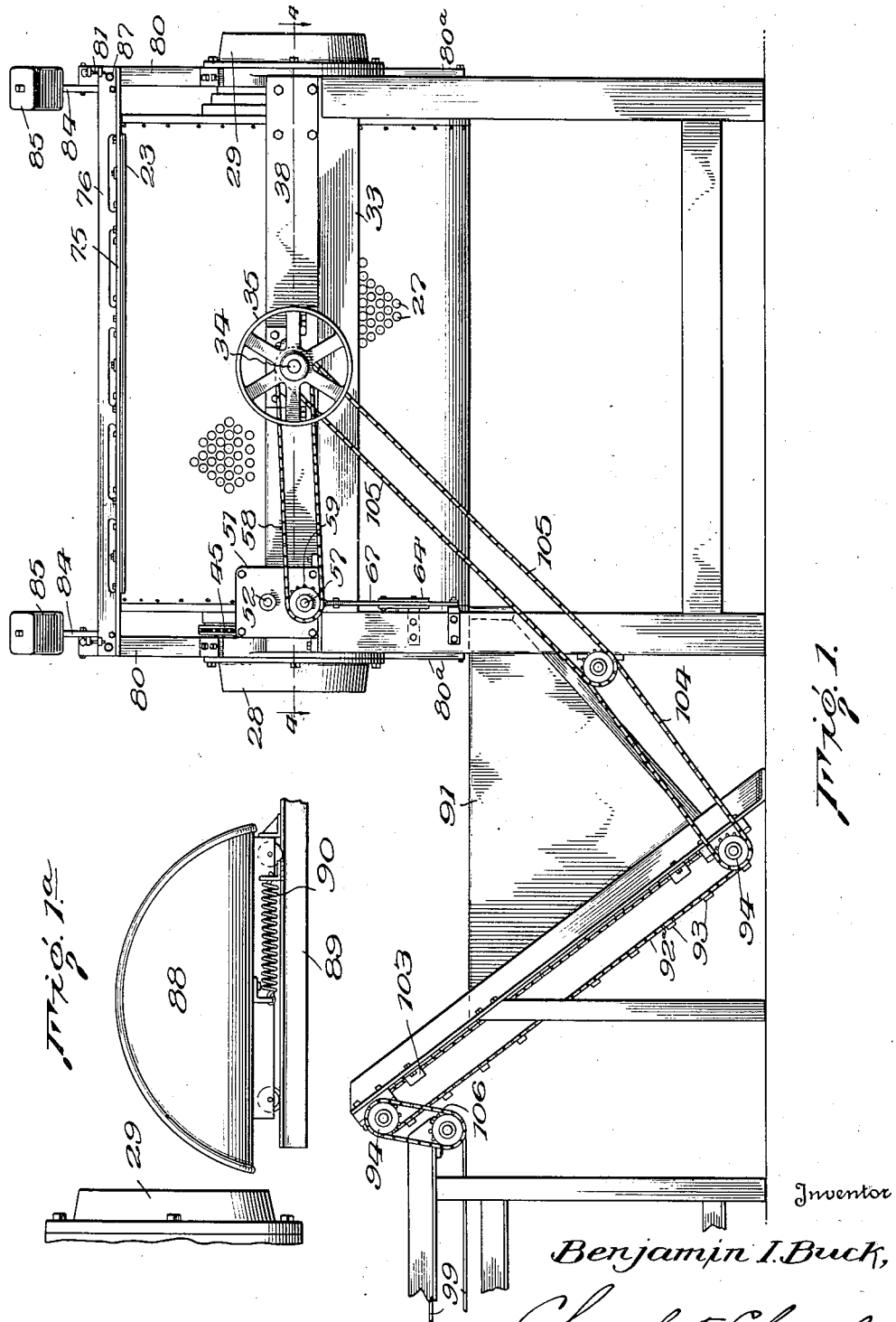
Inventor
Benjamin I. Buck,
By Church & Church
His Attorneys

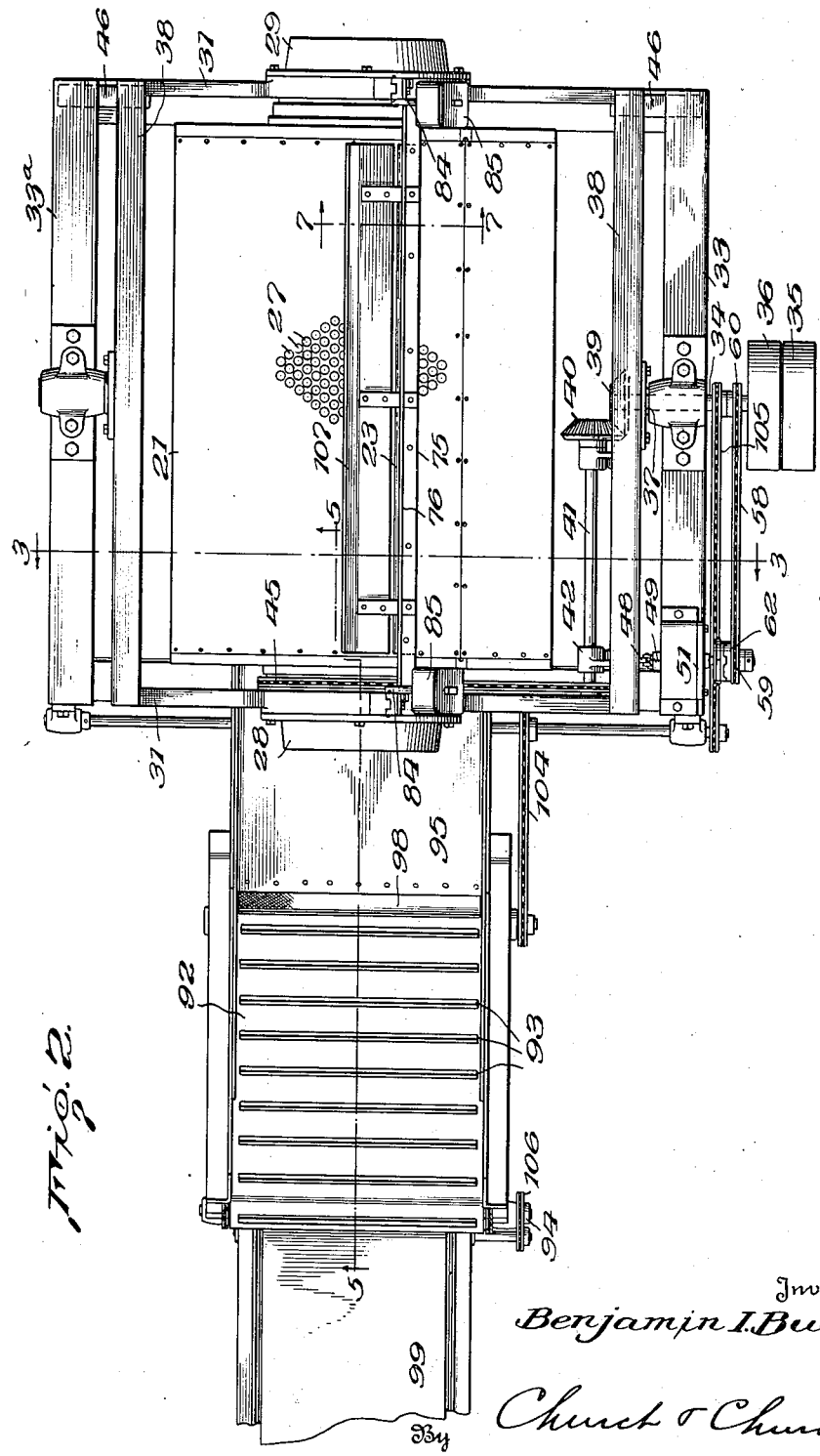

Feb. 5, 1935.    B. I. BUCK    1,990,425
BEAN NIPPING MACHINE
Filed Dec. 30, 1932    9 Sheets-Sheet 3
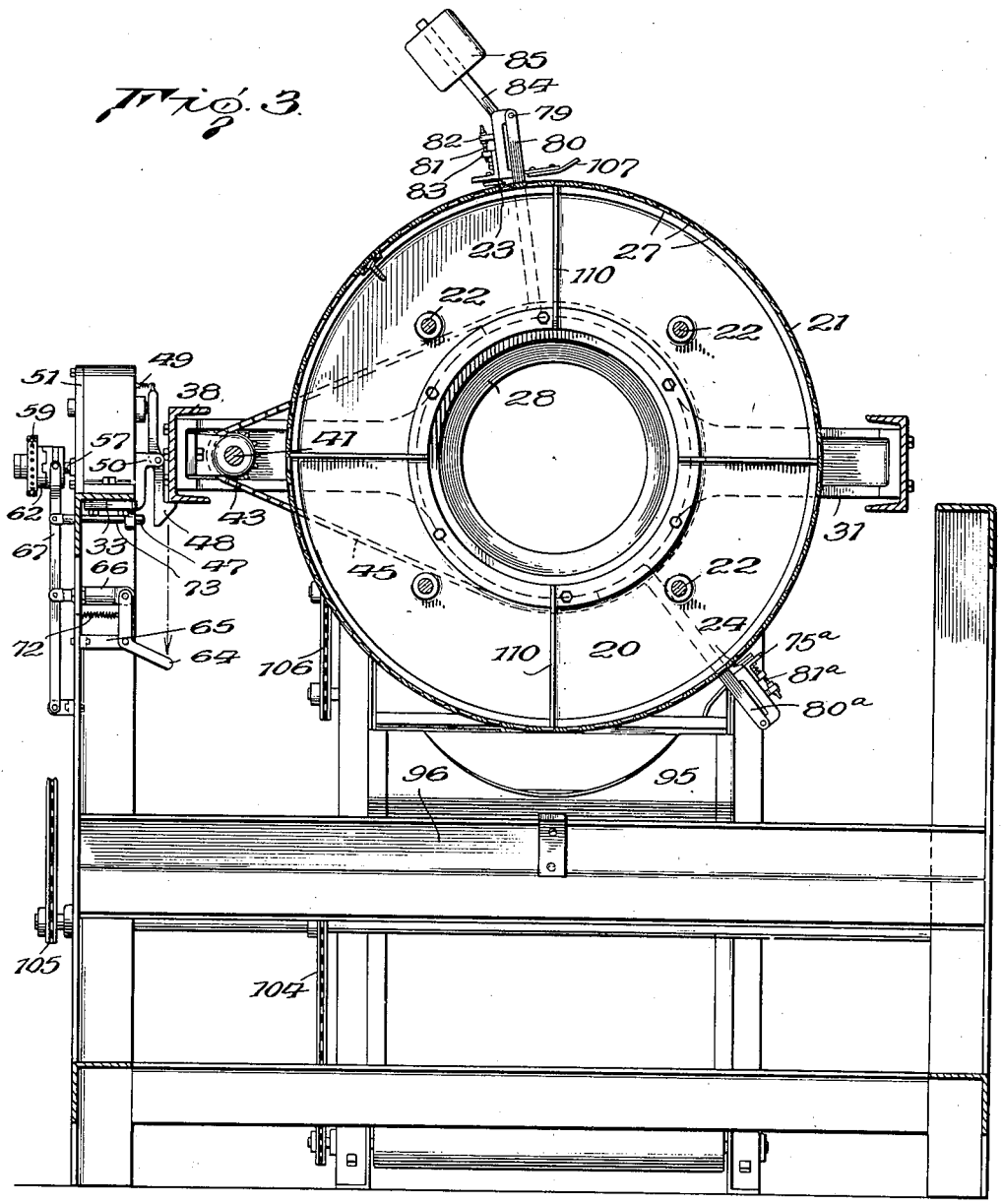
Inventor
Benjamin I. Buck,
By Church & Church
His Attorneys Feb. 5, 1935.　　　　　B. I. BUCK　　　　　1,990,425
BEAN NIPPING MACHINE
Filed Dec. 30, 1932　　9 Sheets-Sheet 4
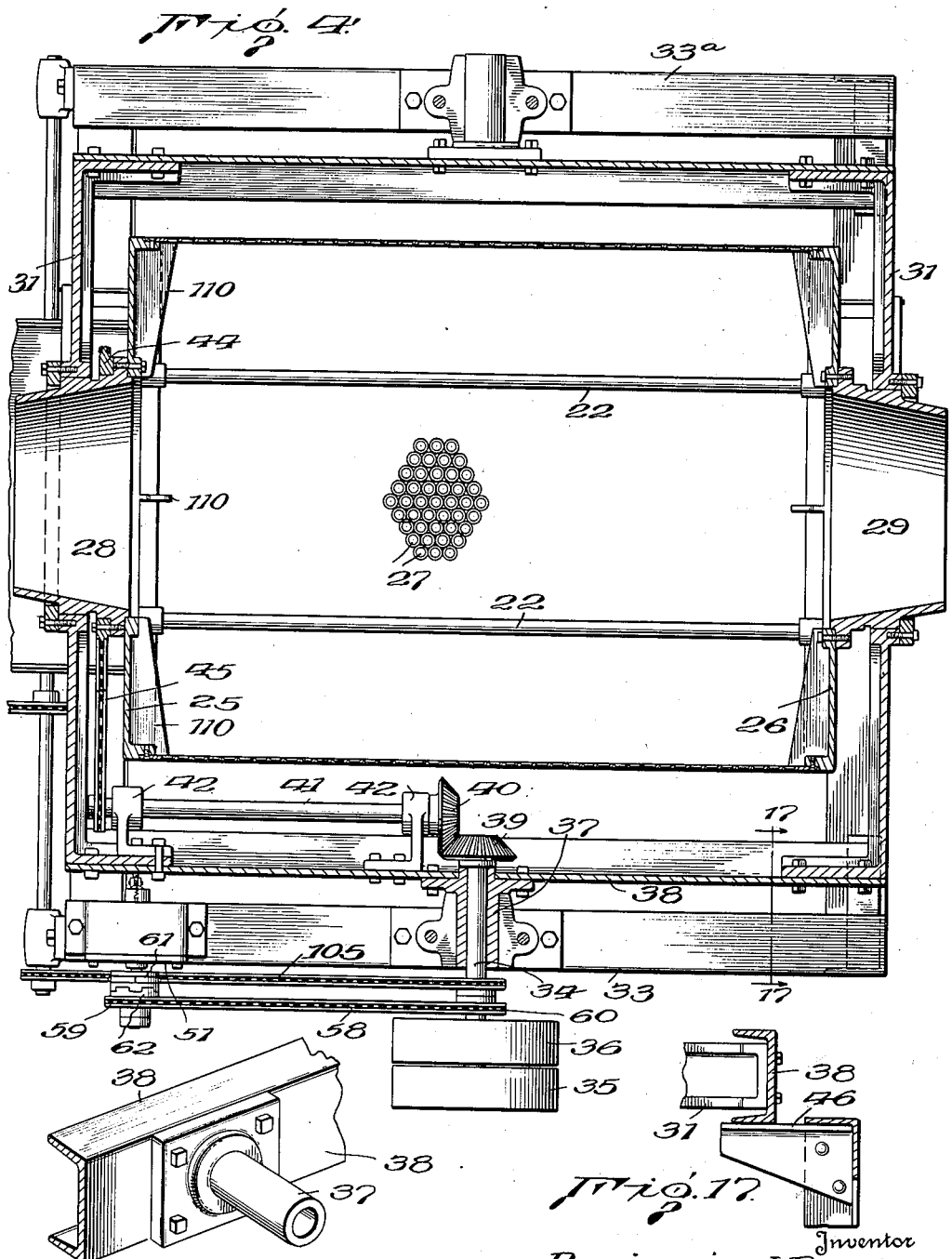

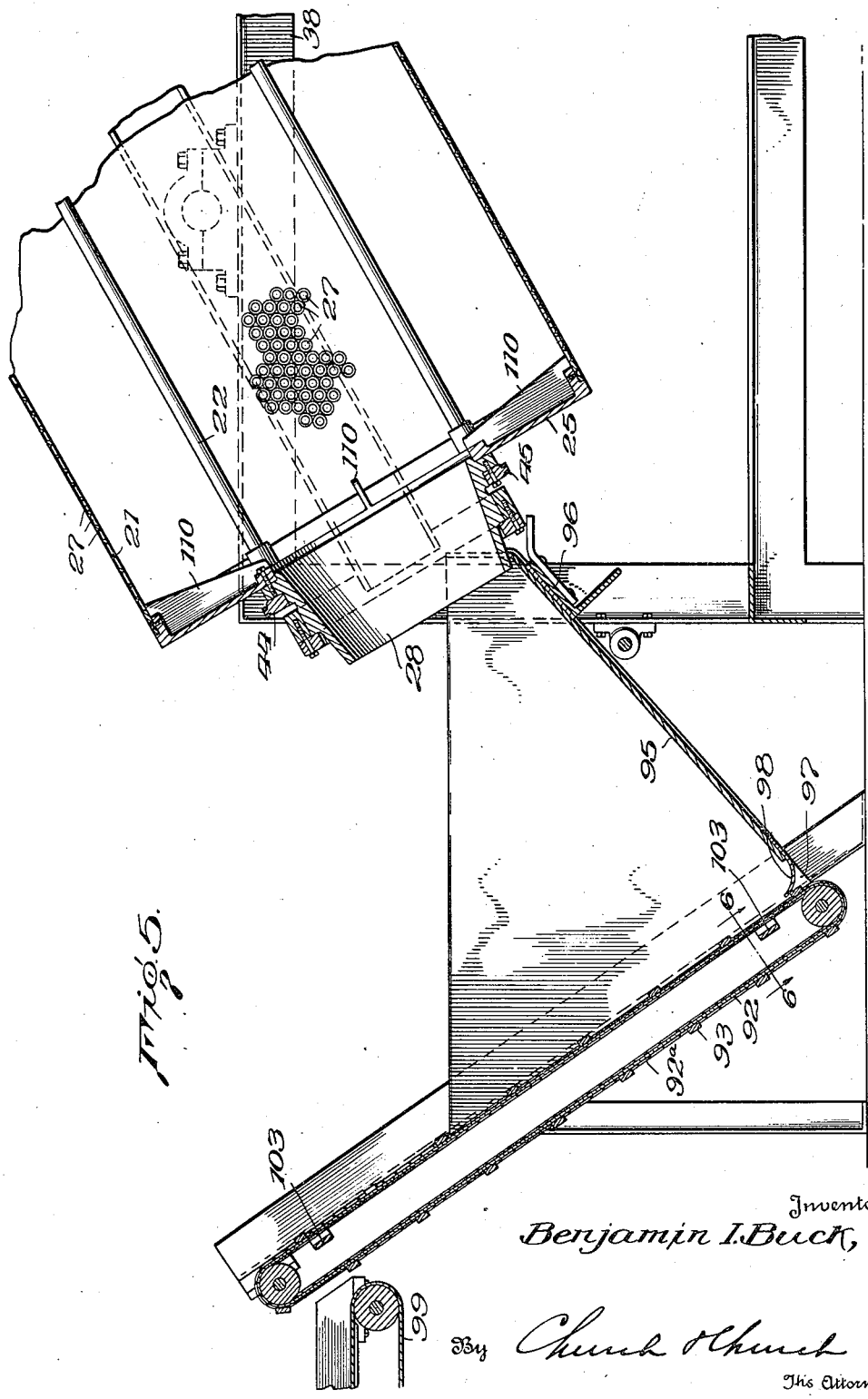

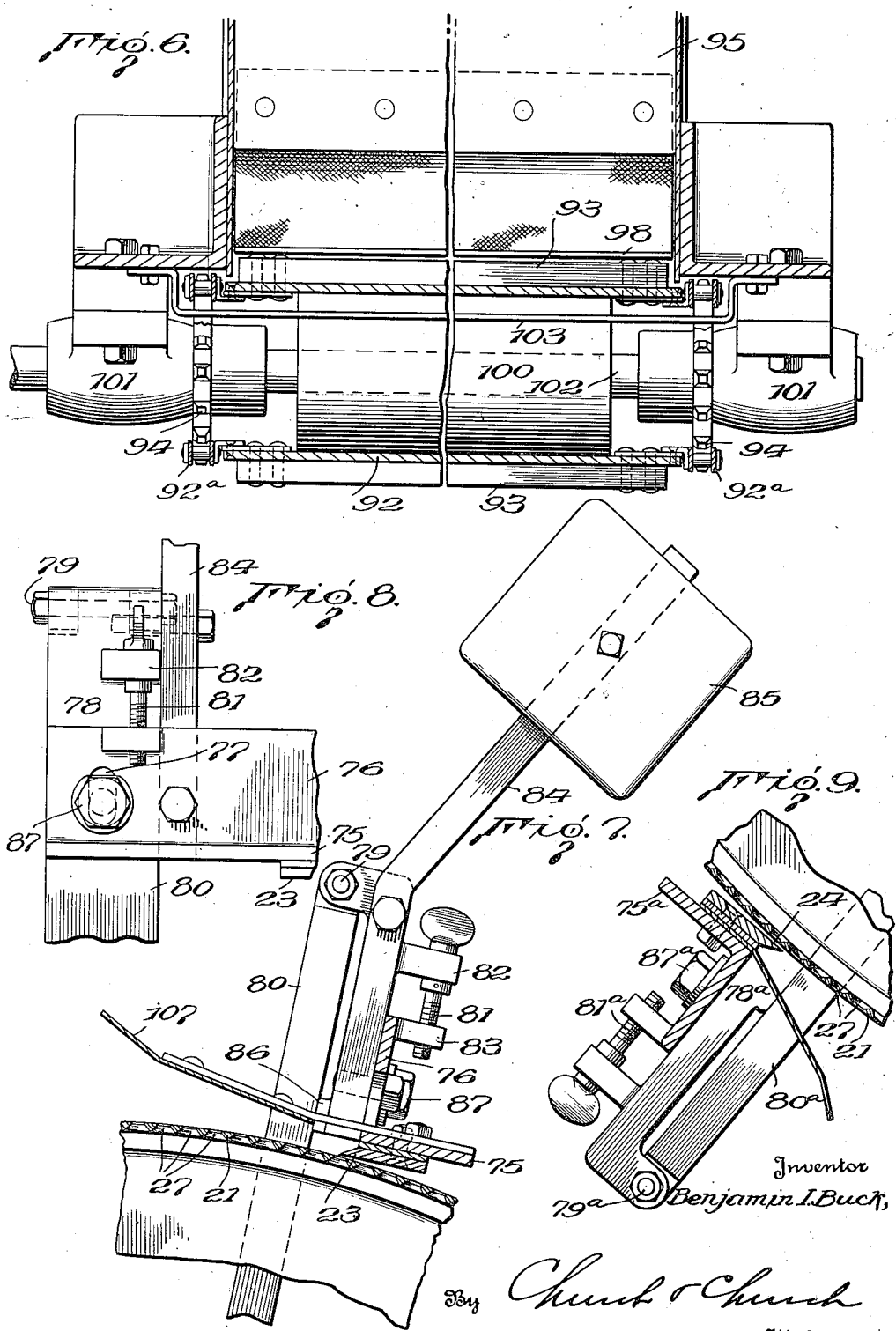

Feb. 5, 1935.  B. I. BUCK  1,990,425
BEAN NIPPING MACHINE
Filed Dec. 30, 1932    9 Sheets-Sheet 7
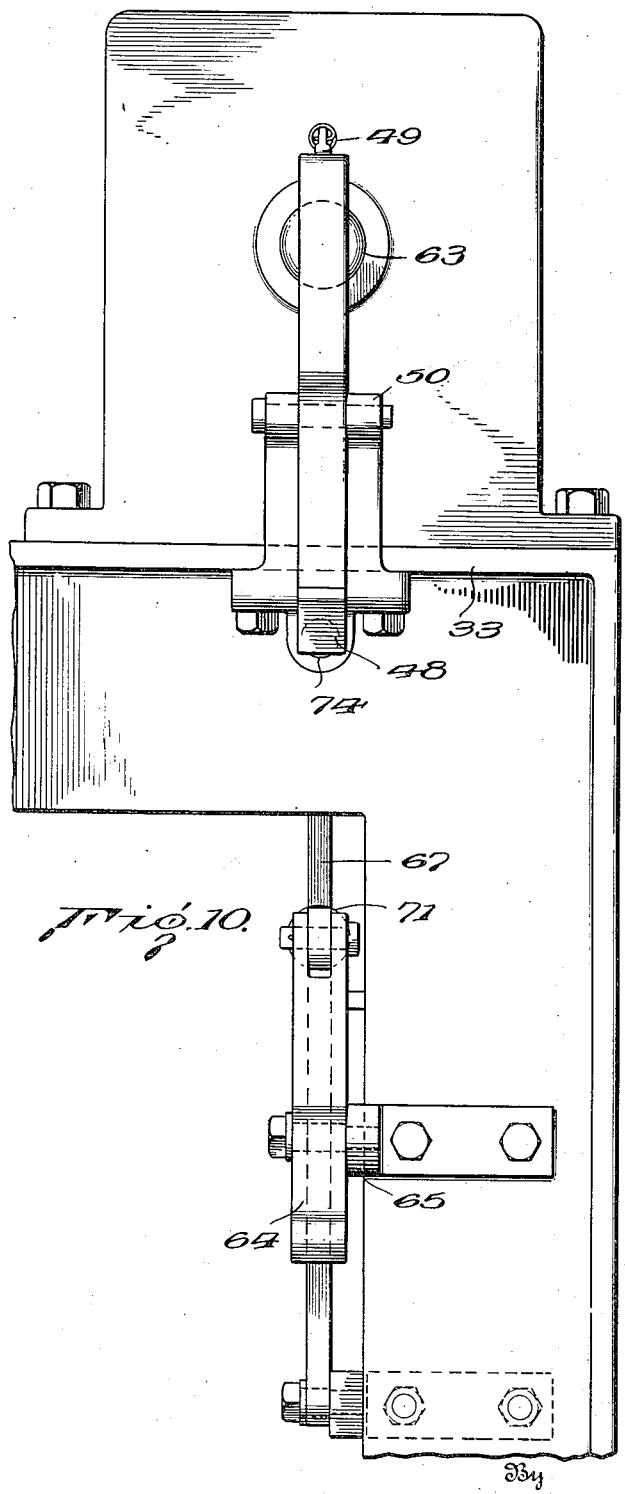
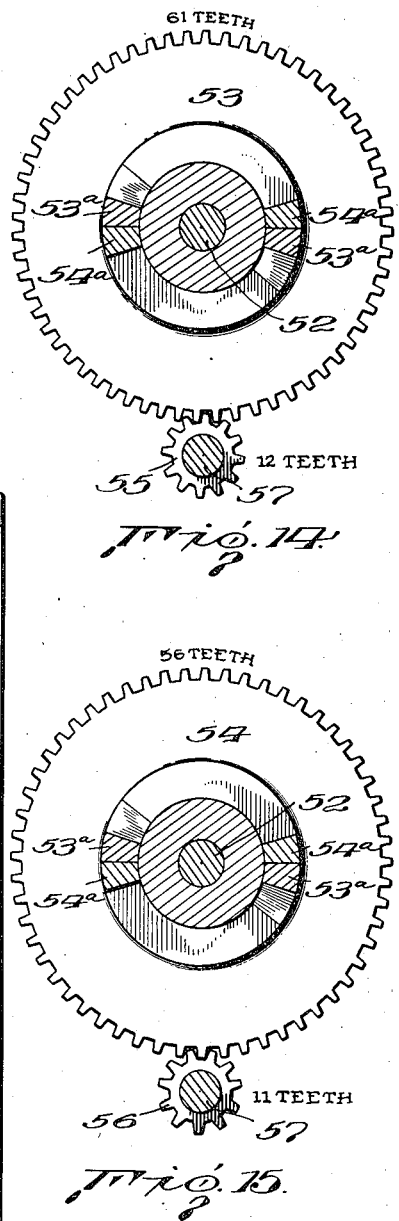
Inventor
Benjamin I. Buck,
By Church & Church
His Attorneys Feb. 5, 1935. B. I. BUCK 1,990,425
BEAN NIPPING MACHINE
Filed Dec. 30, 1932 9 Sheets-Sheet 8
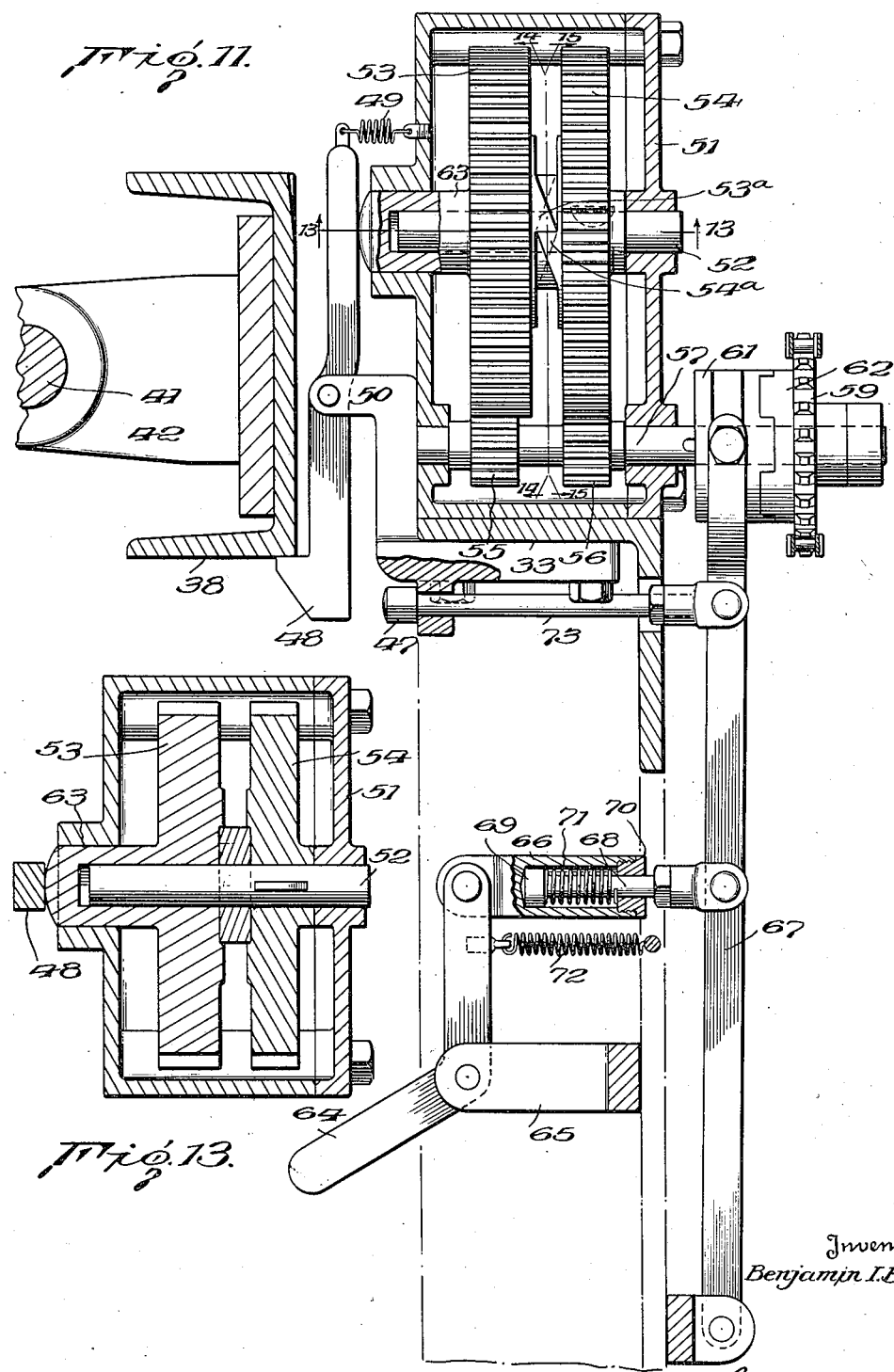

Feb. 5, 1935. B. I. BUCK 1,990,425
BEAN NIPPING MACHINE
Filed Dec. 30, 1932 9 Sheets-Sheet 9
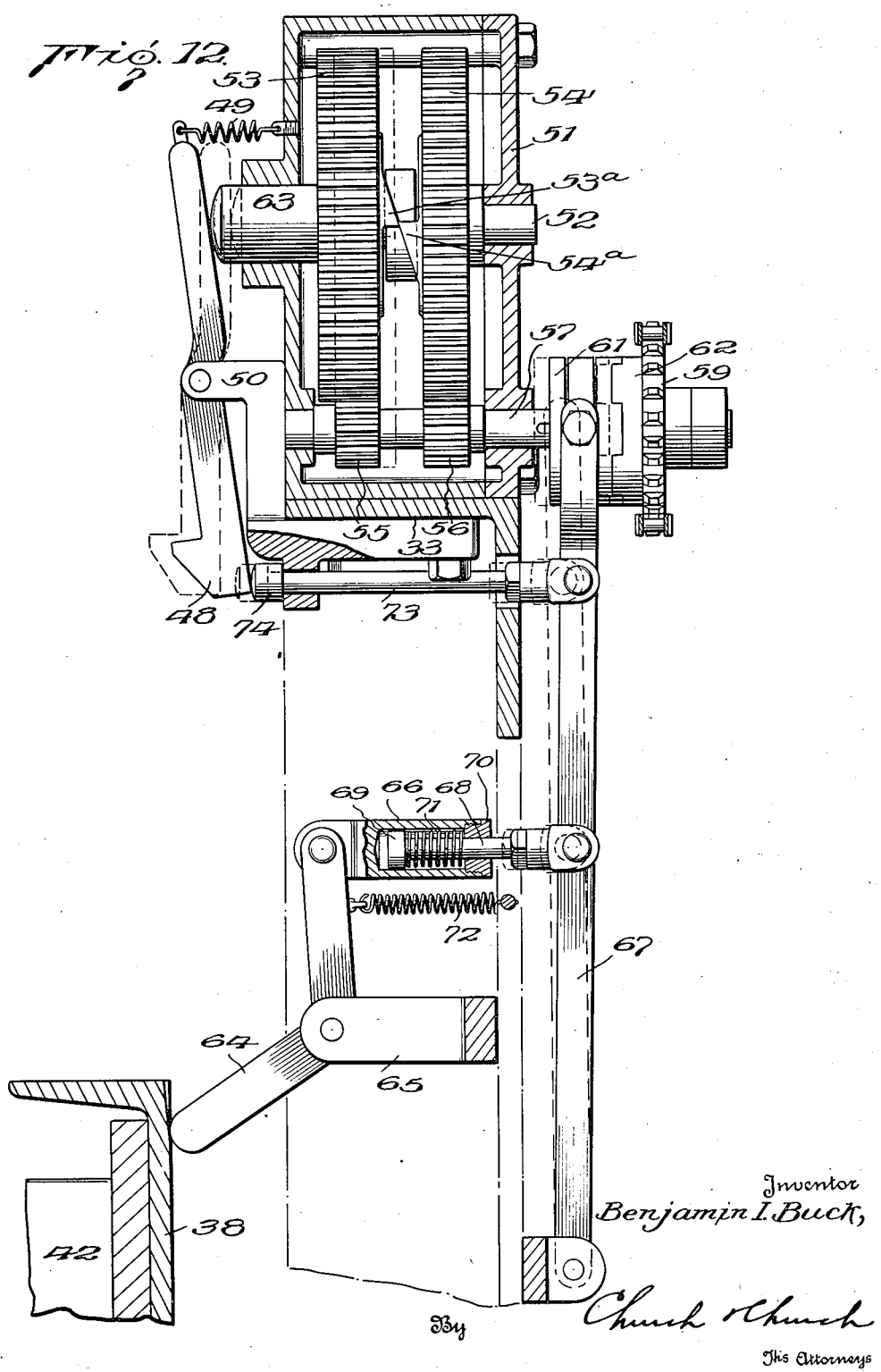
Inventor
Benjamin I. Buck,
By Church & Church
His Attorneys Patented Feb. 5, 1935

1,990,425

UNITED STATES PATENT OFFICE 1,990,425

BEAN NIPPING MACHINE

Benjamin I. Buck, Baltimore, Md.

Application December 30, 1932, Serial No. 649,640

25 Claims. (Cl. 146—86)

This invention relates to improvements in bean nipping machines or apparatus for trimming the ends of bean pods and has to do, more particularly, with improvements in the construction of automatic bean nipping machines of the rotary drum type wherein the bean pods within the drum are thrown, by the rotation of the drum, endwise against the perforated peripheral wall thereof, causing the ends of the bean pods to protrude through the perforations in said wall and be subjected to the cutting action of one or more externally mounted knives, whereby the protruding ends are snipped or severed.

One object of the present invention is to provide a machine wherein the drum may be rotated continuously. More specifically, the invention contemplates an apparatus in which the drum is provided with charging and discharging openings at its ends, the drum being tiltable on a transverse axis, whereby the discharge end may be depressed to permit the discharge of the snipped beans therefrom. It is, of course, necessary that, during the snipping operation, the drum be maintained in its normal operating position so that it cannot be accidentally lowered and the invention, therefore, provides means for maintaining the drum in snipping position and means for automatically releasing such means when discharging is to take place. It will be appreciated that a substantially constant volume of beans will be placed in the drum in successive batches and, consequently, the time consumed in snipping each batch will be substantially constant. In view of this, the automatic releasing means comprises a timing device whereby the drum will be released and permitted to tilt from snipping to discharging position only after each successive batch of beans has been snipped, that is to say, at the end of a predetermined interval after the drum is restored to snipping position.

In order to facilitate handling of the beans after they have been snipped and discharged from the drum, the present apparatus is provided with means for delivering the same in a substantially constant moving column of snipped beans from the snipping apparatus. In other words, the operators handling the beans after they are snipped do not receive each batch of snipped beans in batch volume, but each batch of beans is deposited in a receiver and transferred therefrom to a point for subsequent handling by a conveyor apparatus, the operation of which is so timed with respect to the periodical discharge of the drum that the beans are removed from the reservoir in a constantly flowing column at a rate such as will prevent excessive accumulation of the beans in the receiver.

With these and other objects in view, the invention consists in certain details of construction and combinations and arrangements of parts, all as will hereinafter be more fully described and the novel features thereof particularly pointed out in the appended claims. A construction constituting the preferred embodiment of my invention is illustrated in the accompanying drawings, forming part of this specification, in which,—

Figure 1 is a side elevational view of a machine embodying my invention;

Fig. 1a is an elevational view showing more or less diagrammatically the mode of charging the beans into the rotary drum;

Fig. 2 is a top plan view of the apparatus shown in Figure 1;

Fig. 3 is a transverse sectional view on the line 3—3 of Figure 2;

Figure 4 is a horizontal sectional view on the line 4—4 of Figure 1;

Figure 5 is a vertical sectional view on the line 5—5 of Figure 2 with the drum shown in tilted position;

Fig. 6 is a sectional view on the line 6—6 of Figure 5;

Fig. 7 is a sectional view on the line 7—7 of Figure 2, illustrating the cutter positioned at the upper portion of the periphery of the drum;

Fig. 8 is an elevational view of the cutter mounting shown in Figure 7;

Fig. 9 is a view similar to Figure 7, illustrating the cutters at the lower portion of the periphery of the drum;

Fig. 10 is an elevational view illustrating the removable support for maintaining the drum in horizontal operating position;

Fig. 11 is a vertical sectional view illustrating said support and the timing mechanism for automatically disengaging said support to permit the drum to be depressed to discharging position;

Fig. 12 is a similar view, showing the support disengaged;

Fig. 13 is a sectional view on the line 13—13 of Figure 11;

Fig. 14 is a sectional view on the line 14—14 of Figure 11;

Fig. 15 is a sectional view on the line 15—15 of Figure 11;

Fig. 16 is a perspective view illustrating one of the trunnions for tiltably mounting the drum; and Fig. 17 is a sectional view on the line 17—17 of Figure 4.

In the drawings, the same reference numerals indicate the same parts throughout the several views, and the sectional views are taken looking in the direction of the arrows at the ends of the section lines.

The present improvements have been especially designed in connection with the apparatus disclosed in my patent, No. 1,882,481, granted October 11, 1932, and the mode in which the bean pods are manipulated or acted upon within the perforated drum is described in detail in that patent. In the present instance, suffice it to say that the apparatus consists generally in providing a revoluble drum 20, having a perforated peripheral wall 21, and a plurality of longitudinal tumbling rods 22 in its interior, so located as to break up the mass of bean pods within the drum so that they are thrown endwise against the perforated wall as the drum revolves, with the result that the ends of the pods project through the perforations, so that they will be severed or snipped by a knife, or knives, at the exterior of the drum. Preferably, two knives 23, 24, are provided at the upper and lower peripheral portions, respectively, of the drum. In the machine of my prior patent, the beans were charged into and discharged from the drum through an opening in the peripheral wall. Such a construction requires that the rotation of the drum be stopped each time a batch of beans is placed in or removed from the drum. In the present instance, this feature is eliminated by having the discharge opening at the end of the drum and the drum so mounted that it may be tilted to permit the discharge of the beans through said opening without interrupting the rotary motion of the drum. In this manner, the operation of the machine will be rendered substantially constant, although the beans are snipped in batches, thus avoiding the disadvantages of that type of machine in which the beans are continuously fed to and discharged from the snipping drum or cylinder, a type of machine in which unsnipped beans are apt to be discharged from the drum. It is, of course, entirely practical to place successive batches of beans of substantially constant volume in the drum and, this being true, the tilting of the drum for the discharge of the snipped beans is automatically controlled through timing apparatus, which will permit movement of the drum to discharge position only at predetermined intervals of time after restoration of the drum to snipping position, the time interval being calculated so as to insure the snipping or trimming of substantially all of the beans of each batch.

Referring to the numbered parts of the drawing, the specific machine here illustrated comprises the revoluble drum 20 formed by the spaced heads 25, 26, and the peripheral wall 21, said wall being formed with a multiplicity of perforations 27. Attached to the end walls 25, 26, are hollow trunnions 28, 29, journaled in the end members 31, 31, of a supplemental frame, which, in turn is tiltably mounted in the side members 33, 33a, of what is termed the main frame. Trunnion 29 forms the charging opening at one end of the drum and trunnion 28 the discharge opening at the opposite end of the drum. Rotary motion is imparted to the drum through the following connections: A main drive shaft 34, on which is mounted loose and fast drive pulleys 35, 36, extends through a hollow trunnion 37 attached to one of the side members 38 of the supplemental frame and by which said frame is tiltably mounted on the side member 33 of the main frame. At the inner end of said shaft 34 there is a beveled gear 39 meshing with a similar gear 40 on one end of a shaft 41 journaled in bearings 42, said bearings being mounted on the side member 38 of the supplemental frame. At the opposite end of said shaft 41 there is a sprocket 43, and provided on the exterior of trunnion 28 there is a sprocket 44, said sprockets 43, 44, being connected by sprocket chain 45, whereby rotary motion is imparted to the drum from the main drive shaft 34. The trunnion for tiltably supporting the drum on side member 33a of the main frame may be hollow or solid, it being necessary to have only one hollow trunnion, such as shown at 37, through which the main shaft 34 may extend in order to permit the drum to tilt without interrupting the rotary motion imparted thereto. In other words, upon the drum and supplemental frame being tilted in the main frame, gear 40 simply rolls on gear 39 or, expressed differently, gear 40 moves about the axis of shaft 34, so that there is no need of rendering the drive shaft inoperative when it is desired to tilt the drum for the purpose of discharging beans therefrom.

It is preferred that the tiltable drum be normally maintained in a horizontal position in order to facilitate charging the beans into it and to obtain the greatest efficiency in the snipping of the beans. In view of this, the supplemental frame members 38, at the end of the drum that is raised when the drum is tilted, normally rest upon stops 46 (Fig. 17) on the side members of the main frame. Likewise, the supplemental frame, at the end of the drum that is depressed, is normally supported with the drum in horizontal position by means that are automatically released to permit the drum to be tilted. Such means preferably consist of a latch 48 pivotally mounted between the main frame and the supplemental frame and yieldingly urged into engagement with the side member of the supplemental frame by a spring 49 (see Figs. 3 and 11).

As heretofore mentioned, the drum is adapted to be tilted periodically, the time interval being such as to allow for snipping all the beans in any one batch deposited in the drum. The preferred form of timing mechanism for obtaining this result is shown in detail in Figs. 10 to 15, wherein the latch 48 is shown pivoted in a bracket 50 bolted to the side member 33 of the main frame. Supported on said side member there is a housing 51 in which is mounted a shaft 52, rotatably supporting gears 53, 54, said gears meshing with two smaller gears 55, 56, mounted on a shaft 57 journaled in said housing and adapted to be driven by connections from the main shaft 34. Said driving connections preferably consist of a sprocket chain 58, passing over sprockets 59, 60, on said shafts 57, 34, respectively. Rotation of shaft 57 is controlled by a clutch composed of clutch sections 61, 62, section 61 being slidable on said shaft but keyed thereto and section 62 being loose on the shaft. Sprocket 59 is attached to the loose clutch section 62 and, as will be readily understood, when the two clutch sections are disengaged, shaft 57 will be inoperative. As shown in Figs. 14 and 15, gear 53 has a number of teeth thereon slightly in excess of the number of teeth on gear 54, said gear 53 having sixty-one teeth and gear 54 having fifty-six teeth in the present instance. Likewise, gear 55 has a greater number of teeth than gear 56, the former having twelve teeth and the latter having eleven teeth. With this inequality in the number of teeth on the several gears, one of the gears 53 will be rotated at a slightly greater speed than gear 54. Gear 53 is slidable axially of the shaft 52, and, on the contiguous faces of the gears 53, 54, there are camming surfaces 53a, 54a, so that, as the camming surfaces on one gear overtake the camming surfaces on the other gear, due to the difference in the speed at which the two gears are rotated, gear 53 will be moved away from gear 54, as will be apparent from a comparison of Figs. 11 and 12. This movement of gear 53 is utilized for disengaging latch 48 from the side member of the supplemental frame, as shown in Fig. 12. Preferably, this is accomplished by a trip in the form of a sleeve 63, projecting from the side of gear 53 through an opening in the housing 51 and engaging the upper end of the latch 48. When latch 48 is tripped, the drum may be tilted manually, although in actual practice, the rotary motion of the drum augmented by the preponderance of weight being located at the discharge end of the drum will render manual manipulation unnecessary and will cause the discharge end to automatically move downwardly. When thus lowered, the snipped beans will be discharged through the discharge opening, this movement of the beans being augmented by vanes 110 on the inner surface of the discharge end of the drum. As the discharge end of the drum and the corresponding end of the supplemental frame assume their lowered position, the side member of said supplemental frame engages one arm of a bell crank lever 64, pivoted in a bracket 65 on the main frame. The other arm of said bell crank lever is pivotally connected to a cylinder 66, which, in turn, is connected to the clutch lever 67 by means of a rod 68 pivoted to said lever and projecting into the bore of said cylinder. The end of the rod 68 within the cylinder is formed with an enlargement 69, and interposed between said enlargement and the end closure 70 of the cylinder is a spring 71. A spring 72, attached to the main frame and to the bell crank lever 64, normally tends to urge the bell crank lever and cylinder 69 in a direction which will retain the clutch sections in their engaged position but, as will be understood, when bell crank lever 64 is rocked by the supplemental frame coming into contact therewith, cylinder 66 will be moved and tend to pull clutch lever 67 in a direction to disengage the clutch and render shaft 57 inoperative. However, it will be apparent that shaft 57 must not be rendered inoperative until after the camming members 53a, 54a, have passed one another, because, if the shaft should cease rotating before the two cam surfaces are disengaged, it would be impossible to restore latch 48 to the position it occupies when supporting the drum and supplemental frame. For this reason, the clutch lever has attached thereto a rod 73 whose headed end 74 is engaged by the lower end of latch 48, when said latch is moved out of engagement with the supplemental frame, as shown in full lines in Fig. 12. With the latch 48 held in engagement with the headed end of rod 73, as shown in full lines in Fig. 12, the clutch lever 67 cannot be moved to disengage the clutch and, under these conditions, spring 71 in cylinder 69 will be compressed by the movement imparted to cylinder 66 by bell crank lever 64 being rocked. Therefore, shaft 57 will continue to rotate but, after the cam surfaces 53a have passed off of cam surfaces 54a, and latch 48 is free to be returned to its normal position by spring 49, rod 73 is then released, whereupon spring 71 in cylinder 66 will expand and, through rod 68, move the lever 67 to disengage the clutch and render the timing mechanism inoperative. The timing mechanism will then remain inoperative so long as the discharge end of the drum and the corresponding end of the supplemental frame occupy their depressed position but, after the snipped beans have been discharged and the drum restored to normal position, spring 72 will rock bell crank lever 64 and actuate the clutch lever 67 to reengage the clutch and render the timing mechanism again operative. It will be understood that the rate of movement of gears 53, 54, is such that from the moment the timing mechanism is rendered operative until the moment the cams 53a, 54a, again actuate latch 48, the time interval is such that a new batch of beans may be charged into the receptacle and snipped. In actual operation of the machine, it has been found that the time interval of nine minutes and fifty seconds is sufficient for charging and efficiently snipping a batch of beans and that ten seconds need only be allowed for the cams to move out of engagement after the drum is tilted, so that, it may be said that each batch of beans is snipped in a time interval of ten minutes.

The knives for severing the ends of the bean pods projecting through the perforations 27 of the drum periphery 21, and the mountings for said knives, are shown in detail in Figs. 7 to 9. Referring to Fig. 7, the upper knife 23 is mounted on a bar 75 of plate-like formation and said bar is provided with one or more angularly disposed portions 76, in each of which there is a slot 77. Extending through each slot 77 is a bolt by which the bar 75 is attached to arms 78, pivoted at 79 on uprights, or standards 80, secured to the supplemental frame. The angularly disposed portions 76 being slotted permit the plate 75 carrying the knife 23 and gage plate 107 to be adjusted with respect to the periphery of the drum, this adjustment being effected by means of screws 81 journaled in lugs 82 on the arm 78, which screws are threaded into lugs 83 on the portions 76. As will be apparent, the arms 78, carrying the plate 75 and the knife 23, are pivoted about the centers 79 and, in order to urge the knife toward the periphery of the drum, there is attached to each end of the plate 75 and to the arms 78, an angular post 84 on which is adjustably mounted a weight 85, the angularity of the post 84 being such that the weight 85 is located to one side of the center 79, so that it has a tendency to force the knife 23 toward the drum. To limit the movement of knife 23 toward the drum, the arms 78 are formed with lugs 86, which engage against the standards 80. Knife 24 at the lower portion of the periphery of the drum, and its gage plate 107a, are similarly mounted, being carried by plate 75a attached by bolts 87a to arms 78a, which arms are pivoted at 79a to supports 80a secured to the supplemental frame. Plate 75a is adjustable relative to the periphery of the drum, in this instance, by the screw 81a. In the case of the lower knife, however, the weight of the arms 78a, the plate 75a, etc., is sufficient to hold the knife 24 in its proper position relative to the drum.

For depositing the batches of beans in the drum there may be provided at the charging end a receptacle 88 (Figs. 1a) movable along ways 89 but yieldingly held retracted with respect to the charging opening by spring 90. With this arrangement, a batch of beans in the container 88 is charged into the drum, when the latter is in horizontal position, by moving it along ways 89 against the tension of spring 90 until the feed end thereof is within the charging opening, whereupon, the receptacle may be tilted to deposit the beans in the drum.

As has been said, and as will be apparent from the apparatus so far described, the beans are snipped in batches which are periodically discharged from the drum and, in order that such batch snipping may be effectively co-related with the subsequent handling of the snipped beans as a substantially continuous operation, the snipped beans discharged from the drum, when the latter is tilted, are received in a bin 91, at the discharge end of the drum. However, it is not necessary that the beans, subsequent to trimming, be handled in batches because of the provision, in the present apparatus, of mechanism for removing the beans from the reservoir, or bin, in what has been termed a substantially continuous column, the rate of removal of the beans from the reservoir being so regulated with respect to the successive tilting movements of the drum that an excessive accumulation of beans in the reservoir is impossible. In its preferred form, this portion of the apparatus comprises an inclined endless traveling belt 92, carried by sprocket chain 92a running on sprockets 94, said belt being provided with a plurality of cross-members 93. This inclined belt constitutes one end wall of the bin 91, while the other end wall 95 of the bin may be fixedly mounted on transverse angle 96, secured in the main frame. These inclined end walls constitute the bottom of the bin but, as shown in Fig. 5, the end wall 95 terminates short of the belt 92, leaving a space 97, which is closed by a flexible member 98. This flexible member 98 may be formed of canvas or heavy sheet rubber of strip-like formation, one side edge of said strip being attached to the wall 95, while the other edge is loosely supported on the belt 92. The free edge of member 98, resting loosely on the belt 92, permits said member to be continuously agitated, or to be continuously kicked by the traveling belt, and, in this manner, all the beans will be fed out of the bin. That is, when operation of the machine ceases, it is desirable that all beans shall have been removed from the bin and by the provision of the member 98, which serves as an agitator, it is impossible for the last of the beans to remain in the bin, as the agitation of the member 98 will ultimately cause them to be moved onto the belt 92. The beans carried upwardly by said belt are deposited on a second horizontally disposed belt 99 by which they are transferred to the desired point for further handling. The portion of the belt intermediate its side edges may be supported by rollers 100 (Fig. 6) and the bearings 101 for the shaft 102 on which the sprockets 94 are carried, are held in proper position transversely of the belt by the spacer bars 103. As shown in Fig. 1, motion is imparted to sprockets 94 from the main shaft 34 by sprocket chains 104, 105. Belt 99 may be driven by sprocket chain 106 from the shaft carrying the upper sprockets 94 of belt 92.

As stated above, the rate of removal of snipped beans from the reservoir or bin 91 is to be so regulated as to prevent an excessive accumulation of beans in the bin. That is to say, the bin receives a batch of snipped beans from the snipping drum, which beans are continuously removed from the bin, by the elevator belt 92, at such rate as to substantially empty the bin 91 during the snipping of the next batch. Consequently, the batch snipper delivers beans substantially continuously for the subsequent handling or treatment.

The operation of this apparatus is as follows: As soon as the rotating drum 21 has been restored from discharging to snipping position, and latched in normal operating position by engagement of latch 48 under the supplemental frame member 38, the drum is charged with a batch of bean pods through the charging opening 29. A batch of proper size will have been placed previously in container 88, so that the drum can be quickly charged with the batch by moving container 88 into the charging opening 29 and tilting it up, after which container 88 is withdrawn. As the drum 21 rotates about its horizontal axis, the bean pods therein will be tumbled about and from time to time the unsnipped ends of bean pods will protrude through perforations 27, to the extent permitted by the size of said perforations. As the drum rotates, the protruding ends will engage the gage plates 107, 107a, which slope toward the drum and thus adjust the protruding ends inwardly of the drum in the perforations and determine the amount to be snipped when such protruding ends are carried into engagement with the knife 23 or 24. The ends severed by the knife drop outside of the drum and may be carried away in any suitable manner. The snipped pods drop back into the drum. Experience has shown that, when a batch of bean pods is thus tumbled for about ten minutes, in the drum, both ends of substantially all of the beans will have been snipped.

The restoration of the frame 38 carrying the drum to normal or snipping position, deflects latch 48, which through rod 73, moves clutch member 61 into engagement with clutch 62. The reengagement of the clutch is also augmented by the action of spring 72, bell crank lever having been released when the drum is restored to snipping position. This starts the rotation of shaft 57, the continued rotation of which causes a differential motion of gears 53 and 54 due to the difference in number of teeth, as already explained. When shaft 57 starts to turn, gears 53 and 54, and cam surfaces 53a and 54a, will be in the position shown in Fig. 11. Due to the differential motion, the gears and cam surfaces will gradually reach the position shown in Fig. 12, in which sleeve 63 has pushed the upper end of latch 48 sufficiently to one side to trip the latch and release frame 38, permitting the drum to tilt to discharging position. The gearing is so designed and shaft 57 is driven at such speed as to trip the latch 48 at the end of a predetermined interval, for instance, nine minutes and fifty seconds after restoration of the drum to snipping position. The engagement of frame 38 with bell crank 64 in its movement to discharge position, stores power in spring 71 tending to operate clutch lever 67 to separate clutch members 61 and 62. Rod 73 prevents such action until latch 48 returns to normal position and, thus, shaft 57 continues to turn until gears 53 and 54 and cams 53a and 54a reach the position of Fig. 11. When they reach that position, spring 71 acts to disconnect the drive of shaft 57 and the parts remain stationary until the shaft 57 is driven again upon the restoration of the drum to snipping position, whereupon the cycle is repeated.

The drum rotates continuously in discharge as well as snipping position. After it has been tilted to discharge position, the rotation of the drum causes the snipped bean pods to fall through the discharge opening 28 into the bin 91. The entire batch of snipped beans can thus be emptied quickly into the bin 91. The operator restores the drum manually to snipping position as soon as it has been emptied. The entire cycle of operations, as described above, is then repeated. The operator can easily note when the drum is in discharge position and requiring his attention to restore it to normal, but, if desired, an alarm can be provided to be actuated by movement of the drum to discharge position. The batch of snipped beans in the bin 91 is carried off continuously to subsequent operations, while the next batch is being snipped, as has been explained.

What I claim is:

1. In a machine for trimming the ends of bean pods, a drum having a perforated peripheral wall, means for continuously revolving said drum, one end of said drum being intermittently depressible to discharge the beans therefrom, a cutting blade for severing the ends of beans protruding through perforations in the drum wall, a bin into which said beans are discharged, timing mechanism controlling the periodical discharge of the beans, and a conveyor mechanism for removing the discharged beans from said bin, the operation of said conveyor being so timed with respect to the periodical discharge of the drum as to prevent excess accumulation of beans in said bin.

2. In a machine for trimming the ends of bean pods, a main supporting frame, a supplemental frame having trunnions journaled in the main frame, a driving shaft extending through one of said trunnions, a drum journaled in the supplemental frame on an axis disposed transversely of the axis on which the supplemental frame is journaled, said drum having a perforated peripheral wall and a discharge opening in one end wall, driving connections between said shaft and said drum for revolving the latter, and a cutting blade for severing the ends of beans protruding through perforations in the drum wall.

3. In an apparatus for trimming the ends of bean pods, a main frame, a rotatable drum tiltably supported in said frame, said drum having a perforated peripheral wall and a discharge opening in one end wall, a cutting blade for severing the ends of beams protruding through perforations in the drum wall, a chute on which beans are received from said discharge opening when the drum is tilted in the frame, an endless conveyor disposed at the lower end of said chute, and a vibratory closure spanning the space between said chute and conveyor.

4. In an apparatus for trimming the ends of bean pods, a main frame, a revolving drum tiltably supported in said frame, said drum having a perforated peripheral wall and a discharge opening in the end wall which is depressed when the drum is tilted, a cutting blade for severing the ends of beans protruding through perforations in the drum wall, means for releasably retaining the depressible end in horizontal position, and clutch controlled mechanism for releasing said support.

5. In a machine for trimming the ends of bean pods, a main frame, a rotatable drum in said frame, said drum having a perforated peripheral wall and a discharge opening in one end wall, the discharge end of said drum being depressible, a cutting blade for severing the ends of beans protruding through perforations in the drum wall, a latch normally holding said depressible end against being lowered, driving connections for rotating said drum, and power driven connections for disengaging said latch.

6. In a machine for trimming the ends of bean pods, a main frame, a rotatable drum in said frame, said drum having a perforated peripheral wall and a discharge opening in one end wall, the discharge end of said drum being depressible, a cutting blade for severing the ends of beans protruding through perforations in the drum wall, a latch engaging and supporting said depressible end, driving connections for rotating said drum, a slidably journaled gear, means for rotating said gear, means for sliding said gear toward said latch, and means movable with said gear and engageable with said latch to disengage the latter from said drum.

7. In a machine for trimming the ends of bean pods, a rotatable drum having a perforated peripheral wall and a discharge opening in one end wall, said discharge end being depressible, a cutting blade for severing the ends of beans protruding through perforations in the drum wall, a latch normally preventing said end being depressed, a clutch controlled power driven shaft, a slidable gear operatively associated with said shaft, means slidable with said gear into engagement with said latch to release the discharge end of the drum, and means for rendering said clutch inoperative after said gear has revolved a predetermined distance.

8. In a machine for trimming the ends of bean pods, a rotatable drum having a perforated peripheral wall and a discharge opening in one end wall, said drum being tiltable whereby its discharge end may be depressed, a cutting blade for severing the ends of beans protruding through perforations in the drum wall, a latch normally engaging and supporting said depressible end, and a cam actuated trip engageable with said latch to release said drum end.

9. In a machine for trimming the ends of bean pods, a rotatable drum having a perforated peripheral wall and a discharge opening in its end wall, said drum being tiltable whereby its discharge end may be depressed, a cutting blade for severing the ends of beans protruding through perforations in the drum wall, a support for said depressible end, a pair of gears one of which is rotatable at a speed in excess of the other, and one of said gears being slidably mounted, cam surfaces on contiguous faces of said gears engageable with each other to impart a sliding movembent to the slidable gear, and means operable by the slidable gear for removing the support from the depressible end of the drum.

10. In a machine for trimming the ends of bean pods, a rotatable drum having a discharge opening in one end wall, said drum end being depressible, a cutting blade for severing the ends of beans protruding through perforations in the drum wall, a support for said depressible end, a pair of gears rotatable at different speeds and one of which is slidably mounted, cam surfaces on contiguous faces of said gears engageable with each other to impart a sliding movement to the slidable gear, means operable by the slidable gear for removing said support from the drum, and means for rendering said gears inoperative as the cams move out of contact with each other.

11. In a machine for trimming the ends of bean pods, a rotatable drum having a discharge opening in one end thereof, said drum being tiltably mounted whereby the discharge end may be depressed, a cutting blade for severing the ends of beans protruding through perforations in the drum wall, a support normally engaging the depressible end, a shaft, a pair of gears rotatable at different speeds on said shaft, one of said gears being slidable on the shaft, cams on contiguous faces of said gears adapted to contact with each other and slide the movable gear on said shaft, means movable by the slidable gear into engagement with said support to remove the latter from its drum engaging position, and means for rendering said gears inoperative upon the cams moving out of contact with each other.

12. In an apparatus for trimming the ends of bean pods, a rotatable drum having a perforated peripheral wall and a discharge end in one end wall, said discharge end being depressible to discharge beans from the drum, a cutting blade for severing the ends of beans protruding through perforations in said perforated wall, means normally operative for preventing said discharge end being lowered, and time controlled mechanism for rendering the last metioned means inoperative.

13. A machine for snipping the ends of bean pods comprising the combination of a hollow drum having a perforated peripheral wall, means for rotating said drum about an axis extending longitudinally thereof, means for mounting said drum to permit tilting thereof by gravity about an axis substantially intersecting the axis of rotation midway between the ends of the drum, means effective to prevent tilting of said drum, and a cutting blade positioned to sever the ends of bean pods protruding through the perforated drum wall.

14. A machine for snipping the ends of bean pods comprising the combination of a hollow drum having a perforated peripheral wall and charging and discharging openings at its opposite ends, means for rotating said drum about an axis extending longitudinally thereof, means for mounting said drum to permit it to tilt by gravity about an axis substantially intersecting the axis of rotation midway between the ends of the drum, whereby the end having the discharge opening therein may be depressed to dump a batch of beans from the drum, and a cutting blade positioned to sever bean ends protruding through the perforated side wall.

15. A machine for snipping the ends of bean pods comprising the combination of a hollow rotatable drum having a perforated side wall and a discharge opening in one of its end walls, means for mounting said drum to permit it to tilt by gravity about an axis substantially intersecting the axis of rotation midway between the ends of the drum to depress the end having the discharge opening to dump a batch of beans from the drum, and a cutting blade positioned to sever bean ends protruding through the perforated drum wall.

16. A machine for snipping bean ends comprising the combination of rotatable drum having a perforated peripheral wall and a discharge opening in one of its end walls, means for mounting said drum to permit tilting thereof by gravity about an axis substantially intersecting the axis of rotation midway between the ends of the drum, releasable means holding said drum from tilting, and a cutting blade positioned to sever bean ends protruding through said perforated drum wall.

17. A machine for snipping the ends of bean pods comprising the combination of a rotatable drum having a perforated peripheral wall and a discharge opening in one end wall, means for mounting said drum to permit tilting thereof by gravity from snipping to discharge position about an axis transverse to the axis of rotation, means normally preventing such tilting and automatically rendered ineffective at the expiration of a predetermined interval after movement of the drum from discharge to snipping position, and a cutting blade positioned to sever bean ends protruding through the perforated drum wall.

18. A machine for snipping the ends of bean pods comprising the combination of a main frame, a supplemental frame journaled in the main frame to tilt by gravity about an axis, a rotatable drum journaled in the supplemental frame to rotate about an axis, said axis of tilting substantially intersecting the axis of rotation midway between the ends of the drum, means for continuously rotating said drum, and a cutting blade positioned to sever bean ends protruding through the perforated drum wall.

19. A machine for snipping the ends of bean pods comprising the combination of a rotatable hollow drum having a perforated peripheral wall and a discharge opening in one end wall, a frame, means for mounting said drum in said frame to permit tilting thereof by gravity about an axis substantially intersecting the axis of rotation midway between the ends of the drum, and cutters mounted to tilt with the drum and positioned to sever bean ends protruding through the perforated drum wall.

20. A machine for snipping the ends of bean pods comprising the combination of a supporting frame, a hollow drum mounted in said frame and having a perforated peripheral wall and a discharge opening in one end wall, said drum being mounted to rotate about an axis of rotation and to tilt by gravity about an axis substantially intersecting the axis of rotation midway between the ends of said drum, and being unbalanced with respect to the axis of tilting whereby it tends to tilt in a direction to depress the discharge end, releasable means for maintaining the drum against tilting, and a cutting blade positioned to sever the ends of bean pods protruding through the perforated drum wall.

21. A machine for snipping the ends of bean pods comprising the combination of a hollow rotatable drum having a perforated peripheral wall and a discharge opening in one end wall, means for mounting said drum to permit tilting thereof by gravity about an axis substantially intersecting the axis of rotation midway between the ends of the drum, a plurality of radially disposed vanes positioned on the inner surface of said end wall to facilitate discharge of beans through said discharge opening when the drum is tilted, and a cutter positioned to sever bean ends protruding through the perforated drum wall.

22. A machine for snipping the ends of bean pods comprising the combination of a hollow drum having a perforated peripheral wall and a discharge opening in one end wall, means for rotating said drum, means for mounting said drum to permit tilting thereof by gravity about an axis substantially intersecting the axis of rotation to depress the end having the discharge opening, means for severing bean ends protruding through the perforated drum wall, and means within the drum for directing beans toward said discharge opening when the drum is tilted to depress it.

23. A machine for snipping the ends of bean pods comprising the combination of a hollow drum having a perforated peripheral wall and a discharge opening in one end, means for rotating said drum, means for mounting the drum to permit tilting by gravity from snipping to discharge position about an axis transverse to the axis of rotation, releasable means for retaining the drum in snipping position, an automatic device for releasing said last-named means at the end of a predetermined period of rotation in snipping position, and a cutter positioned to sever bean ends protruding through the perforated drum wall.

24. A machine for snipping the ends of bean pods comprising the combination of a main frame, a supplemental frame mounted in the main frame so as to be tiltable by gravity about an axis, a hollow drum, having a perforated peripheral wall and a discharge opening in one end, journaled in the supplemental frame to rotate about an axis transverse to the axis of tilting, means for rotating said drum, a retractable member normally restraining the tilting of the supplemental frame from normal position, means for automatically retracting said element at the end of a predetermined period of rotation of the drum in normal position, and a cutter for severing the bean ends protruding through the perforated drum wall.

25. A machine for snipping the ends of bean pods comprising the combination of a hollow drum having a perforated peripheral wall and a discharge opening in one end, power means for rotating said drum, means for mounting said drum to tilt from snipping to discharge position about an axis transverse to the axis of rotation, a retractable element normally retaining the drum in snipping position, a timing device driven by said power means and operable to retract said element after a predetermined period of rotation, means actuated by movement of the drum from discharge to snipping position for setting the timing device in operation, and a cutter for severing bean ends protruding through the perforated drum wall.

BENJAMIN I. BUCK.